United States Patent [19]

Stiles

[11] 4,173,458
[45] Nov. 6, 1979

[54] AIR CLEANER

[76] Inventor: Arthur G. Stiles, 4581 Allison St., Wheatridge, Colo. 80033

[21] Appl. No.: 948,671

[22] Filed: Oct. 5, 1978

Related U.S. Application Data

[63] Continuation-in-part of Ser. No. 771,241, Feb. 28, 1977, abandoned.

[51] Int. Cl.² .............................................. B01D 45/14
[52] U.S. Cl. ......................................... 55/405; 55/457
[58] Field of Search ................. 55/393, 396, 400, 401, 55/402–407, 409, 456, 457, 408, DIG. 28

[56] References Cited

U.S. PATENT DOCUMENTS

| 624,592 | 5/1899 | Whitney | 55/405 |
|---|---|---|---|
| 1,232,464 | 7/1917 | Houghton | 55/407 |
| 3,670,480 | 6/1972 | Peterson | 55/430 |
| 3,973,937 | 8/1976 | Peterson | 55/404 |

FOREIGN PATENT DOCUMENTS 7259 of 1906 France ......................................... 55/407
1038578 2/1950 France ......................................... 55/401

Primary Examiner—David L. Lacey
Attorney, Agent, or Firm—Richard D. Law

[57] ABSTRACT

A housing, with a freely rotating, actuated impeller, having a peripheral slot-like outlet, a central circular air outlet for attachment to a suction line, and an air inlet intermediate the two outlets in the housing providing direct communication with the impeller, whereby air entering the inlet rotatively actuates the impeller. By proportioning the housing and the rotor, about 90% of the incoming air is cleaned and goes through the central outlet for use, and about 10% of the air with centrifugally separated dirt exhausts through the peripheral outlet.

6 Claims, 3 Drawing Figures

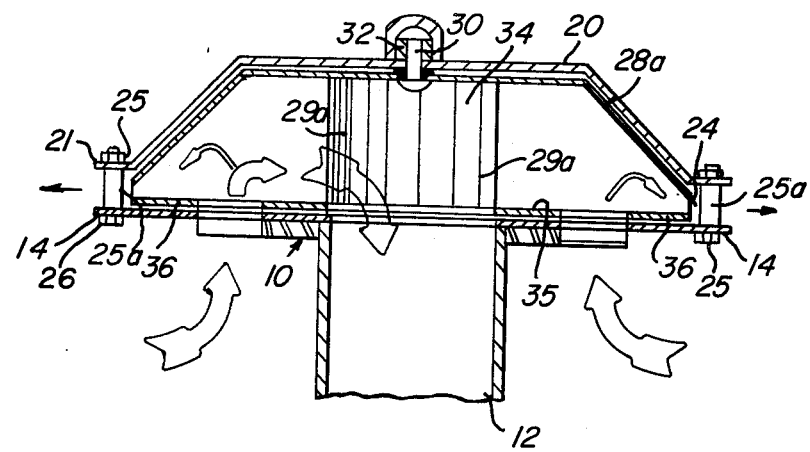
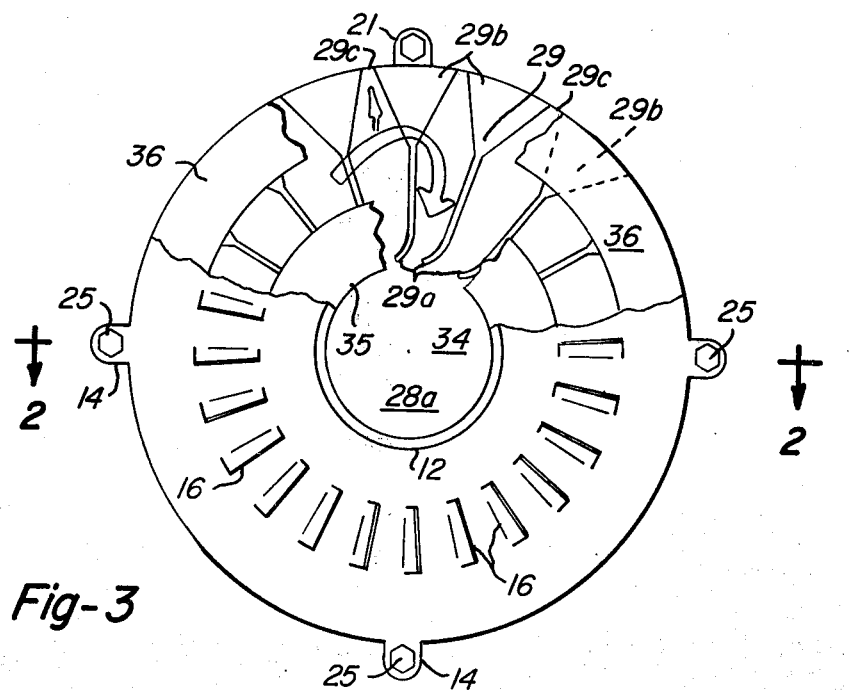

AIR CLEANER

RELATED U.S. APPLICATION DATA

This application is a continuation-in-part of U.S. patent application Ser. No. 771,241 filed Feb. 28, 1977 now abandoned.

BACKGROUND TO THE INVENTION

This invention relates to centrifugal air cleaners and particularly to air cleaners for internal air combustion engines.

PRIOR ART

Air cleaners for internal combustion engines are generally of the filter element type, cyclone type (incoming air is directed tangentially to a cylinder wall, or centrifugal types using a positively driven rotor for centrifugally removing dirt from air). The filter element type (for example, most passenger car air filters) are satisfactory until a very dirty ambient atmosphere is present. Such a condition may require very frequent filter element changes so as to severely reduce engine operating time as well as increasing the cost of the operating of the engine. The centrifugal or cyclone type causes a swirling or a vortex of the incoming air. The swirling air along the inside wall of a container is subjected to considerable turbulance which may cause reentrainment of a substantial amount of the centrifugally separated dirt. Further, some authorities in field, theorize that abrasion or a ball mill effect along the cyclone wall reduces the size of the separated, fast moving dirt, particularly the larger particles and agglomerates, into fines which are considerably more difficult to separate from the air. Such fines may be reentrained in the outgoing supposedly cleaned air.

The rotor has advantages over the other types, as dirt separated from the air is carried away from the clean air. Some examples of various types of air cleaners are; U.S. Pat. No. 1,698,104 to Bennett which discloses a non-rotating mineral wool filter element used in conjunction with a cyclone effect cleaner. Goldberg, et al, U.S. Pat. No. 2,610,702 describes an air cleaner using a rotary fan driven by the engine crank shaft to force air along a curved wall for centrifugal separating dirt from the air. However, a filter element is positioned on the inside of the centrifugal air curve to pick up air which is cleaned of its larger particles of entrained dirt.

In U.S. Pat. No. 3,016,109, Howard provides a filter element cleaner driven by the power shaft of a helicopter (a turbine engine). The unit has a scanning blower driven by the turbine shaft to reverse blow air through the cylindrical air filter to blow out dirt picked up by the filter, so as to keep the filter clean.

A rotary element in the Alsobrooks, U.S. Pat. No. 3,444,672 imparts a rotary motion to air for a turbine engine. This element is driven by the shaft of the engine turbine. A different type of air cleaner for turbine engines is shown in Moore, et al U.S. Pat. No. 3,402,881 where a drum shaped filter element, around the vanes of the rotor or impeller, filters incoming air. Vibration of the engine is utilized to cause a back flow of air to clean the drum filter.

GENERAL DESCRIPTION OF THE INVENTION

According to the present invention, there is provided a rotary air cleaner using the engine's suction to propel the incoming air so as to rotate an impeller. The impeller is proportioned with its housing to separate a small percentage of the air, for example about 10% of the incoming air along with separated dirt, so that a major portion, for example, about 90%, of the incoming air passes to the engine as clean air. The incoming air rotates the impeller which centrifugally separates entrained dirt from the air, and the dirt is ejected with about 10% of the air. The housing of the device is arranged with a full peripheral outlet for the separated dirt and a small percentage of the air flow and also, has a central, clean air outlet. An air inlet arrangement into the rotor is positioned between the two outlets. The invention is described in relation to an air cleaner for internal combustion engine or air compressor utilizing engine suction to propel incoming air, and the moving incoming air is utilized to rotate the impeller. The air cleaner may, also, be arranged in an air line having moving air, which may be force driven or suction driven air, for cleaning the air passing through a line.

OBJECTS OF THE INVENTION

Included among the objects and advantages of the present invention is to provide a rotary air cleaner for air lines, separating entrained dust and dirt from incoming air utilizing a small portion of that air for the discharge of the separated dust and dirt and providing a discharge of a major portion of the air as clean air.

Another object of the invention is to provide a simple, highly effective air cleaner using an air actuated rotor for centrifugally separating entrained dust and dirt from an air stream.

Another object of the invention is to provide a centrifugal air cleaning device for a flow of air utilizing a small fraction of that air to actuate centrifugal air cleaning means and entrained dirt removal from the air stream.

Still another object of the invention is to provide an air cleaner for internal combustion engines having a freely rotating, air driven rotor separating entrained dirt from the air and discharging the dirt by means of a small portion of the air stream to be cleaned.

An additional object to the invention is to provide a centrifugal air cleaner which does not require dirt pickup means and returns the dirt back into the ambient atmosphere.

A still additional object to the invention is to provide a centrifugal type air cleaner in which a rotor is proportioned so that a predetermined quantity of air and separated dirt from dirty incoming air is discharged from the periphery of the rotor and a major, predetermined quantity of clean air is passed through the central portion of the rotor.

GENERAL DESCRIPTION OF THE DRAWINGS

These and other objects and advantages of the invention may be readily ascertained by referring to the following description and appended illustrations in which:

FIG. 2 is a cross-sectional, side elevational view of a form of the invention shown in FIG. 3, along section lines 2—2, illustrating the movement of air in the air cleaner.

FIG. 3 is a bottom plan view of the device of FIG. 2, partially cut-away.

SPECIFIC DESCRIPTION OF THE DRAWINGS

Figure 1:
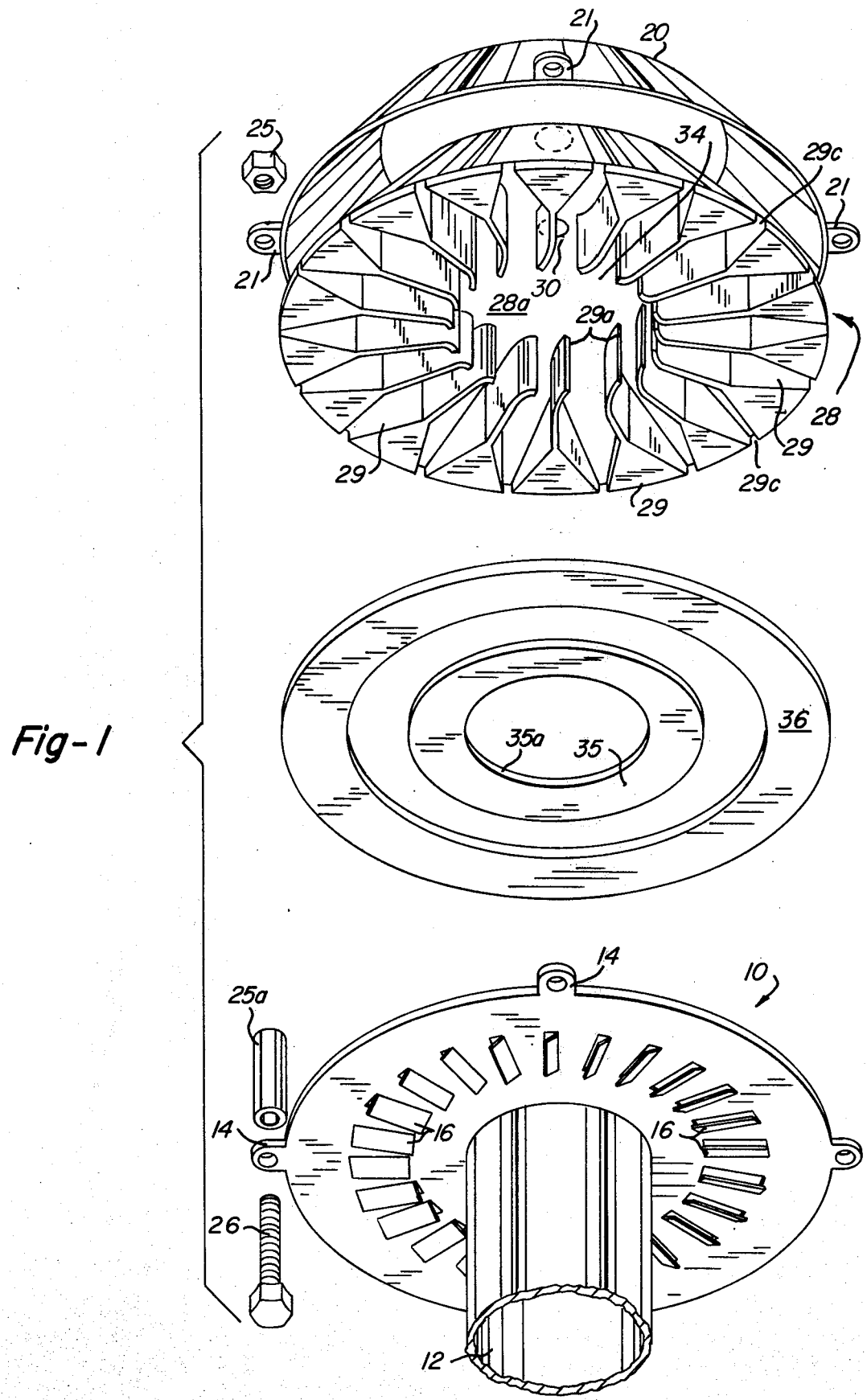
FIG. 1 is an exploded projection at 45°, of one form of a rotary air cleaner.

As shown in the device FIGS. 1–3, an air cleaner, according to the invention, includes a lower housing portion shown in general by numeral 10, having a central air outlet tube 12, and a series of spaced apertured ears 14 around the periphery of the circular portion of the housing 10. A series of punched-out portions or louvers in the bottom housing member 10 having openings 16 providing air inlet means are shown. A dish shaped housing cover 20 is provided with apertured ears 21 for mating with the ears 14 of the housing bottom so that the two circular members may be secured together in position to leave a full peripheral outlet 24 around the dome shaped housing. Bolts 26 and nuts 25, with a spacer 25a, secured through the ears hold the top and body spacedly together. A freely rotating impeller or rotor shown generally by numeral 28, provided with a plurality of vanes 29, has a depending shaft 30 which extends through the dome-top 20. Journal 32 provides for free rotation of the rotor in the housing.

The rotor includes a dish shaped top plate 28a which extends to the periphery of the vanes 29 of the rotor. The vanes 29, on the bottom of the disc are arranged to terminate on their inner ends 29a leaving a generally circular central void 34 of the same general dimension as the air outlet 12. The vanes are arranged with thin inner ends while their outer ends 29b are thickened or bifurcated, or other configurations to reduce the total amount of peripheral opening 29c, controlling the quantity of air passing peripherally outward through the outer openings between the vanes.

The rotor is mounted on the dome top 20 by the shaft and bearing assembly so as to be freely rotating. The vanes are generally concave on their inner ends aiding rotation when impelled by incoming air. The upper top 20 and lower housing 10 are constructed to be reasonably close fitting around the rotor, preventing any contact between the rotor and housings. The rotor is preferably mounted by a sealed, anti-friction and thrust bearing of precision construction for free rotation and minimum care. The louvers 16 are arranged in a circle midway between the outlet tube 12 and the outer rim of the flat portion of the housing. The louvers are slanted to give a clockwise (viewed from below) twist to the air entering the unit through the louvers. Preferably, the total cross-section of those louvers is about 10% greater than the cross-section of the outlet tube 12.

The configuration of the vanes is a most important feature of the device. These vanes extend from the cylindrical void at the entrance to the outlet tube 12 to the outer periphery of the rotor. The vanes terminate in the joined housing members, to provide peripheral openings between the top and bottom housings. The vanes have thin, slightly curved proximal ends, and wider distal ends to reduce the size of openings between the vanes.

Ring 36 is secured to the outer portions of the vanes, and along with the top 28a form pockets of tranquil air into which dirt is thrown and from which it is ejected. An inner ring 35 secured to the vanes prevent turbulence being generated in the drive section of the rotor due to the motion of the rotor in relation to the stationary housing. An inner opening 35a is approximately the diameter of the outlet tube 12, but may be slightly larger.

The device of the invention operates when the air outlet to 12 is interconnected with a carburetor, for example, of an internal combustion engine. Suction generated by movement of the pistons of the engine pulls air through the tube 12, past the rotor from inlets 16. When suction first is applied to the outlet tube 12, air will flow into the openings 16 and the space between the outer ring 36 and lower housing, as well as the intake louvers. In a very few seconds the rotor attains operating speed due to the impingement of the air entering through the slanted louvers 16 on the vanes 29. The slight curvature on the proximal ends of the vanes contributes to the rotation of the rotor. The air within the spaces between the vanes 29, the dish shaped top of the rotor 28a and the outer ring 36, then is subjected to centrifugal force and is ejected through openings 29c. The outward flow from these spaces is controlled by the size of the openings 29c. Since this outward flow is a work load and tends to reduce the speed of rotation of the rotor, it must be restricted to a small fraction (15% or less) of the flow through the outlet tube 12. Particles of solid matter and liquid droplets are thrown into this outward flowing air, or gas, and likewise, are ejected. The air in these spaces is relatively tranquil with respect to the rotor. This eliminates turbulence that would re-entrain these particles and droplets in the main stream flowing out the outlet tube 12. At operating speed, the rotor is moving about as fast as the air entering the louvers due to the turbine-like action of the inner portion of the vanes. Thus, the vanes divide the incoming air into segments with a minimum of turbulence. The incoming air and dirt particles attain a velocity in passing through the inlet louvers, so they are instantly subjected to a centrifugal force on entering the rotor. The dirt is thrown into the space above the outer ring by the time the rotor has turned 45° and, once in this space, is ejected.

The air cleaner, as shown, is arranged with the air inlet on the housing bottom between the peripheral outlet 24 and the central outlet 12. The inlet, however, could as well be formed in the top cover of the housing in approximately the same position. Furthermore, the device may operate in any position; the position being shown is generally upright with the domed housing on top. Where desired, a bag filter may be placed around the housing covering the peripheral outlet 24 so that ejected dirt and dust may be collected in a bag filter.

The placement of the inlet openings generally centrally of the peripheral outlet and central air outlet openings results in very little relative motion between the incoming air stream and the rotor, thereby producing a minimum of turbulence during the separation. The entrained dust and moisture, in the incoming air, are centrifugally thrown into generally tranquil air pockets and are removed with a minimum amount of air to the peripheral exhaust, and holding reentrainment to a minimum. The device provides a positive ejection of dirt and no additional energy sources are necessary for the movement of the rotor. Variation in the design of the inlet louvers and ejection peripheral slots permits variation in rotor speed, efficiency and air resistance.

What is claimed is:

1. An air cleaner for an air line comprising:
   (a) housing means having cover means and a bottom housing member which are arranged with respect to each other to define a narrow, peripheral air outlet therebetween;
   (b) a freely rotating rotor, rotatively mounted in said housing means in proximity to said cover means;

(c) said rotor having a series of spaced impeller vanes terminating at their distal end adjacent said peripheral air outlet and constructed and arranged with a substantially reduced outlet space between said vanes and terminating at their medial ends short of the rotor axis so as to leave a central opening communicating with the space between the vanes;

(d) a central air outlet in said housing means in communication with said rotor central opening and arranged for a communicating connection with an air line; and (e) air inlet means in said housing means intermediate said peripheral air outlet and said central air outlet in direct communication with said impeller vanes on said rotor, and constructed and arranged to rotate incoming air whereby incoming air rotates said rotor.

2. An air cleaner according to claim 1, wherein:
said cover means is dish-shaped so as to generally encompass said rotor and positioned with respect to said bottom member to provide the narrow peripheral opening.

3. An air cleaner according to claim 1, wherein:
said impeller vanes are widened at their distal ends.

4. An air cleaner according to claim 1, wherein:
said air inlet means includes slanted slots for injecting air into said vanes at an angle to rotate the same.

5. An air cleaner according to claim 1, wherein:
said rotor is freely mounted on a shaft journalled on said cover means.

6. An air cleaner according to claim 1, wherein said rotor includes a top disc rotatively mounted in said housing means, said vanes being secured to said disc, and pair of annular rings secured concentrically to the bottom of said vanes including an inner annular ring having a central opening at least as large as said rotor central opening and an outer annular ring spaced from the inner annular ring so as to provide a space for incoming air to reach said vanes and terminating at the distal ends of said vanes.

* * * * *